United States Patent [19]

Barth et al.

[11] Patent Number: 4,955,744
[45] Date of Patent: Sep. 11, 1990

[54] CLAMPING FIXTURE FOR AXIALLY CLAMPING A TOOL IN PLACE, IN PARTICULAR A DISC

[75] Inventors: Walter Barth; Friedrich Häusslein; Winfried Helm; Manfred Stäbler, all of Leinfelden-Echterdingen, Fed. Rep. of Germany

[73] Assignee: Robert Bosch GmbH, Stuttgart, Fed. Rep. of Germany

[21] Appl. No.: 372,350

[22] PCT Filed: Dec. 5, 1987

[86] PCT No.: PCT/DE87/577
§ 371 Date: Jun. 14, 1989
§ 102(e) Date: Jun. 14, 1989

[87] PCT Pub. No.: WO88/05386
PCT Pub. Date: Jul. 28, 1988

[30] Foreign Application Priority Data
Jan. 15, 1987 [DE] Fed. Rep. of Germany ....... 3700968

[51] Int. Cl.⁵ .............................................. B25G 3/00
[52] U.S. Cl. ..................................... 403/259; 411/432; 51/168
[58] Field of Search .................. 403/259, 24; 411/432, 411/433; 51/168, 378

[56] References Cited

U.S. PATENT DOCUMENTS 2,586,530  2/1952  Godfrey ............................ 51/168 X
2,704,426  3/1955  Macaulay ............................ 51/168

FOREIGN PATENT DOCUMENTS 932794  4/1948  France .

Primary Examiner—Andrew V. Kundrat
Attorney, Agent, or Firm—Michael J. Striker

[57] ABSTRACT

A clamping fixture for axially clamping a tool, on a flange of a driven spindle and comprising a clamping nut having an internal thread to be screwed on an end portion with an outer thread of the driven spindle, a clamping member arranged between the tool and the clamping nut for transmitting an axial clamping force to the tool upon tightening of the clamping nut, a manually operable adjustable member freely rotatable relative to the end portion of the driven spindle, and a gearing for gear-coupling the adjusting member to the clamping nut and gear-coupling the clamping nut to the clamping member.

34 Claims, 4 Drawing Sheets

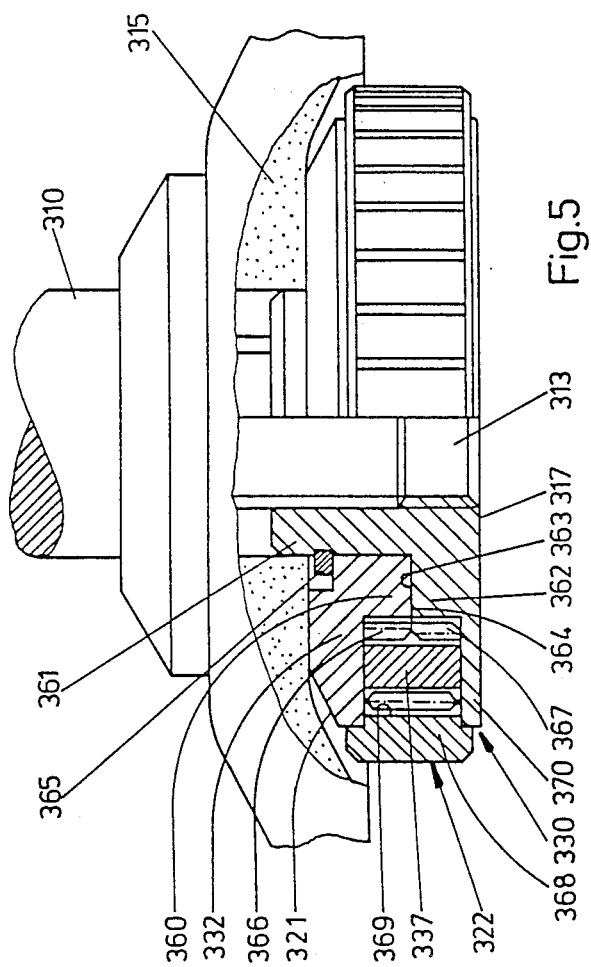

CLAMPING FIXTURE FOR AXIALLY CLAMPING A TOOL IN PLACE, IN PARTICULAR A DISC

BACKGROUND OF THE INVENTION

The invention relates to a clamping fixture for axially clamping a tool in place in particular a disc and comprising a clamping nut to be screwed on a threaded end of a spindle, and a clamping member arranged between the nut and the spindle. Clamping fixtures of this type are suitable in particular for portable power hand tools and in this respect particularly for grinding machines, for example. A clamping fixture of the said type has been disclosed (German Pat. No. Spec. 3,012,836) in which the clamping member consists of an element which is roughly pot-shaped in cross-section and is axially supported on the clamping nut via a helical spring. When the clamping nut is screwed on and tightened, the hat-shaped clamping member is pressed axially against the tool via the axially compressed spring, and the tool is thereby tightened against the flange on the spindle side, the end face of a cylindrical sleeve extension of the clamping nut bearing directly on a facing axial side of the flange on the spindle side and, during further tightening of the clamping nut, the flange on the spindle side being tightened together with the clamping nut. This is to ensure in an angle grinder that the grinding disc is mounted with a predetermined contact pressure and that this contact pressure remains at the right level. The clamping fixture is also intended to permit a quick and simple interchange of the grinding disc and, at the same, time avoid overloading of the power hand tool, in particular the angle grinder. This is because, if the torque acting on the grinding disc is too great, the grinding disc stops, while the flange on the spindle side and also the clamping nut having the clamping member perform a relative movement thereto. The effect of the clamping nut automatically being tightened further in operation, makes it considerably more difficult to loosen the clamping nut, when changing the grinding disc, in this clamping fixture. Therefore, loosening of the clamping nut is here only possible with assistance of a special auxiliary tool, the spindle, depending on the design of the machine, having to be appropriately counterheld by a second auxiliary tool, e.g. a spanner.

SUMMARY OF THE INVENTION

The object of the invention is to provide a clamping fixture in which a tool change is possible without any auxiliary tool, which tool change, in addition, can be performed quickly and safely. The object of the invention is achieved by providing a manually operable adjusting member and a gearing for clamping the adjusting member to the clamping nut and the clamping nut to the clamping member. An advantage of the invention also consists in that power hand tools already existing can also be changed over without any special redesign. For example, merely the change of the existing clamping nut for the complete part, consisting of the axially held-together parts of adjusting member, clamping member, clamping nut and gearing in between, is sufficient for this purpose. Thanks to the gearing, the assembly can be tightened by hand to effect clamping with further tightening taking place automatically during operation when the power hand tool is switched on. The gearing makes possible a stepping-up with the generated torque increase during tightening. During loosening, this torque-increasing effect of the gearing can be eliminated quickly and easily by turning of the adjusting member, by slight unscrewing with axial relief whereby, the frictional engagement between the flange of the clamping member and the tool is cancelled. As soon as this frictional engagement no longer exists, the assembly can, without the gearing becoming active, be unscrewed and also screwed on in an opposite direction as a unit, e.g. like a previously used spindle nut. The gearing is simple and requires little space, so that there are virtually no greater dimensions.

The novel features which are considered as characteristic for the invention are set forth in particular in the appended claims. The invention itself, however, both as to its construction so to its mode of operation, together with additional objects and advantages thereof, will be best understood from the following description of preferred embodiments when read in connection with the accompanying drawings.

BRIEF DESCRIPTION OF THE DRAWINGS

FIG. 5 shows a schematic, partial longitudinal side cross-sectional view, approximately corresponding to FIG. 1, of a clamping fixture according to a fourth embodiment according to the invention.

DESCRIPTION OF THE PREFERRED EMBODIMENTS

Figure 1:
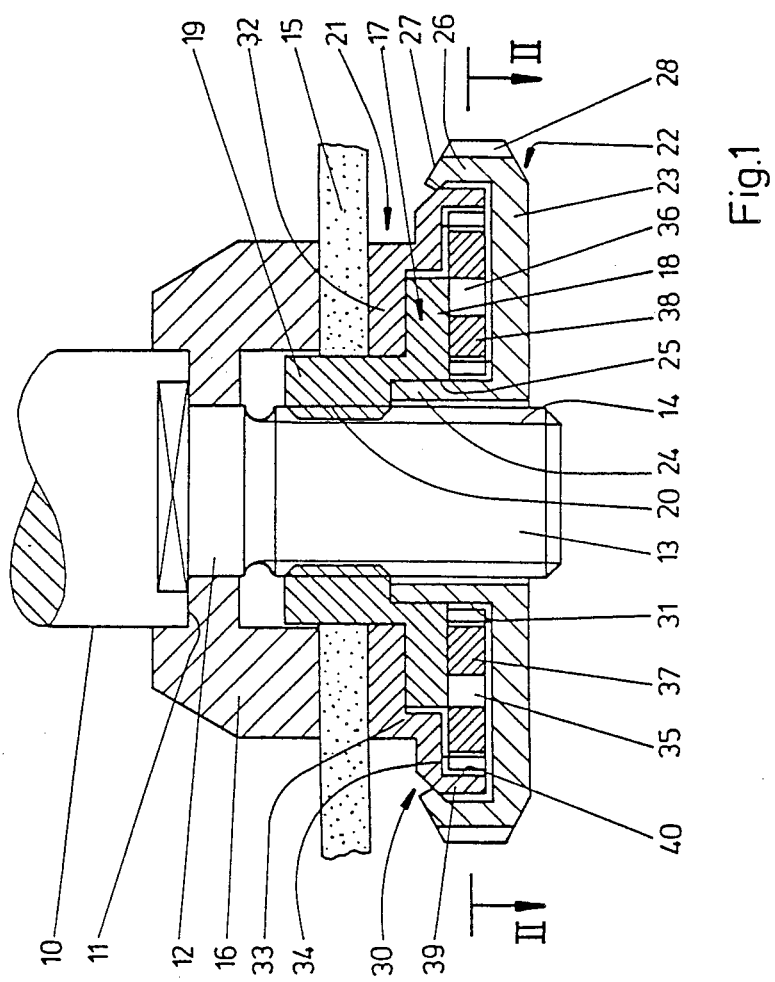
FIG. 1 shows a schematic, axial longitudinal cross-sectional view of a first embodiment of a clamping fixture according to the invention as part of an angle grinder having a mounted grinding disc.
Figure 2:
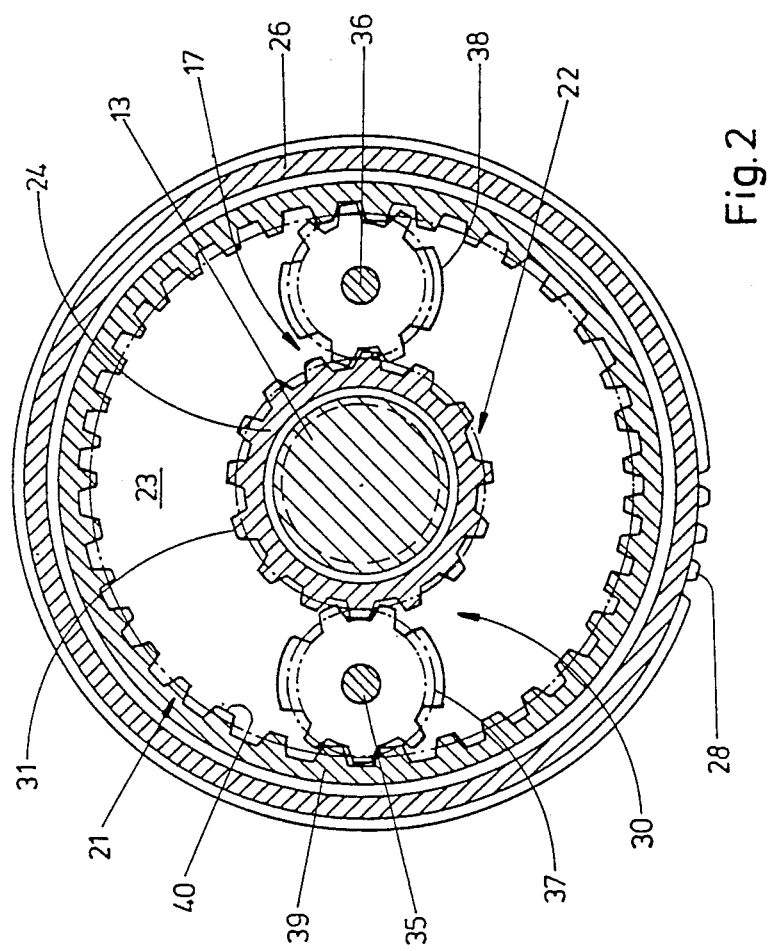
FIG. 2 shows a schematic cross-sectional along the line II—II in FIG. 1.

FIGS. 1 and 2 schematically show the lower part of a portable power hand tool which is designed, for example, as an angle grinder and has a spindle 10 which is motor-driven via a gearing and, at the end, merges via an annular shoulder 11 into a cylindrical step 12 of smaller diameter and then into an end-side threaded step 13 having an external thread 14. The spindle 10 serves to drive a tool 15 which consists, for example, of the grinding disc indicated or another tool disc, a rubber plate, the saw blade of a circular saw or the like. The tool 15 is mounted and clamped in place between a flange 16 and a clamping nut 17. The flange 16 is axially supported on the shoulder 11 and centred radially on the cylindrical step 12. It is coupled in a positive-locking manner to the spindle 10.

The clamping nut 17 has an annular flange 18 and a cylindrical sleeve 19, integral with the said flange and extending away from it, and is provided in the region of the cylindrical sleeve 19 with an internal thread 20, with which the clamping nut 17 is screwed onto the external thread 14 of the threaded step 13. The tool 15 is centred on the outer peripheral surface of the cylindrical sleeve 19 during fixing.

Arranged in the axial area between the tool 15, on one side, and clamping nut, 17 on the other side, is a clamping member 21. This can be acted upon from the clamping nut 17 by an axially directed pressure force, and is able to press axially against the tool 15 and press the latter against the axial end face of the flange 16.

The clamping fixture of the type described has, furthermore, a manually operable adjusting member 22, held freely rotatably relative to the threaded step 13. The adjusting member 22 is designed as a disc 23 which is approximately U-shaped in cross-section, which bears in the center a journal 24, which is integral therewith and is passed through by the threaded step 13, with a play in between. The adjusting member 22 is centered and mounted on the clamping nut 17 via an axial step of the journal 24, extending at a distance from the disc 23. This also may take place, for example, on an outer cylindrical peripheral surface of a part of the cylindrical sleeve 19 extended axially beyond the annular flange 18. In the case of the embodiment shown in FIG. 1, the clamping nut 17 has, in axial region of its cylindrical sleeve 19 and its annular flange 18, an inner cylindrical peripheral surface 25, which serves as bearing surface and on which the adjusting member 22 is centred and mounted through a part of the journal 24.

The clamping fixture includes, furthermore, a gearing 30, via which the adjusting member 22 is gearcoupled to the clamping nut 17 and the latter is gearcoupled to the clamping member 21. The gearing 30 is contained inside between the clamping member 21 and the adjusting member 22. In this arrangement, the adjusting member 22 is combined and held together with the gearing 30, the clamping nut 17 and the clamping member 21 to form a part which can be screwed as a complete part, somewhat in the manner of a nut, onto the threaded step 13 of the spindle 10 and thus, as a part, can be exchanged at any time as desired for a differently configured clamping nut. This complete part is held together to form a part by the cross-sectionally approximately U-shaped disc 23 bearing on the free rim of its annular part 26, facing the tool 15, a radially inwardly directed ring 27, which engages at least with a radially inwardly directed component over the clamping member 21 in this region and thus holds it axially on the adjusting member 22. The annular part 26 is provided on the outside with a knurl 28, so that the adjusting member 22 is consequently easier to grip and can be turned better by hand.

The gearing 30 is designed here as a single-stage step-up gearing in the form of a toothed-wheel gear and, in this case in particular, as a planetary wheel gear. In the case of another embodiment, not shown, the gearing 30 may consist of another type of gear, which may possibly also be of multi-staged design to achieve a transmission ratio. Part of the gearing 30 is firstly a pinion 31, which is an integral part of the journal 24 of the adjusting member 22 and, in this case, is arranged coaxially to the journal 24. In this case, the pinion 31 is located in the axial region which extends axially between the disc 23, on one side, and the axial step, which serves for the mounting of the adjusting member 22 and is centred and mounted on the peripheral surface 25, on the other side. The pinion 31 thus directly adjoins the disc 23 axially. It is designed as sun wheel of the planetary wheel gear. Via this pinion 31, a drive moment can be introduced into the gearing 30 upon rotational operation of the adjusting member 22.

The clamping member 21 is designed approximately inversely pot-shaped in cross-section and has a flange 32 and a cylindrical part 33, axially adjoining thereto, coaxial thereto and integral therewith. The cylindrical part 33 is adjoined by an annular disc 34, integral with it. With the axial surface facing the tool 15, the flange 32 can be pressed against the tool 15. The flange 32 forms with the adjoining cylindrical part 33 and the annular disc 34 a receptacle for the clamping nut 17. The flange 32 is passed through in the center by the cylindrical sleeve 19, which is centered and mounted with its outer peripheral surface in the center of the flange 32. The annular flange 18 is mounted within the annular space bounded by the cylindrical part 33 with annular disc 34, the annular flange 18 being able to press axially against the flange 32.

The clamping nut 17 is designed with regard to the gearing 30, designed as planetary wheel gear, as planet carrier. Its annular flange 18 has on the axial side, which is remote from the flange 32, at a radial distance from the center, at least one or, as shown in the first embodiment in FIGS. 1 and 2, two bearing pins 35, 36 with a planet wheel 37 and 38, respectively, rotatably mounted thereupon, in each case. The planet wheels 37, 38 are here diametrically opposite each other and, in each case, in engagement with the pinion 31 forming the sun wheel.

Part of the gearing 30 is, furthermore, a ring 39, which is provided with an internal toothing 40 and is designed as a hollow wheel of the planetary gear. Both planet wheels 37, 38 are in engagement with the internal toothing 40. The ring 39 is an integral part of the clamping member 21. It adjoins the annular disc 34, being remote from the flange 32.

FIG. 1 shows the clamping fixture in the clamping position in which the tool 15 is clamped axially in place on the flange 16 by the flange 32 of the clamping member 21.

If the tool 15 is to be removed and changed, for this purpose the adjusting member 22 is turned by hand in a "release" direction. The flange 32 is in this case initially still in frictional engagement with the tool 15 and is still to be held in place thereby, so that, on account of the rotation of the pinion 31 and rotational operation of the planet wheels 37, 38 caused as a result, the latter rolls on the internal toothing 40 and thus the clamping nut 17, designed as planet carrier, is moved and axially loosened, at least slightly. The axial force pressing the flange 32 against the tool 15 is in this case at least reduced, so that the frictional engagement between the flange 32 of the clamping member 21, on one side, and the tool 15, on the other side, is cancelled. With cancelled frictional engagement, as soon as the clamping member 21 is freely movable, further rotation of the adjusting member 22 in the "release" direction has the consequence that then the planet wheels 37, 38 stop relative to the ring 39 with the internal toothing 40, that is they no longer run around, so that the clamping nut 17 also stops, and with it the clamping member 21. Thus, a turning of the adjusting member 22 is transferred directly to the clamping nut 17 and the clamping member 21, so that the following parts are quickly unscrewed and released from the threaded step 31 virtually like an integral spindle nut: adjusting member 22, planet wheels 37, 38, clamping nut 17 and clamping member 21. This assembly can thus then be unscrewed completely and easily by hand from the threaded step 13. If the tool 15 has been exchanged and a new one is to be mounted, the procedure is as follows. First the flange 16 is slipped onto the spindle 10. After this, the new tool 15 is located in position and then the assembly described is placed on, as otherwise an integral clamping nut would be, and screwed with the internal thread 20 of the cylindrical sleeve 19 onto the threaded step 13. In the process, the cylindrical sleeve 19 passes through the tool 15, which is centered thereon. When the assembly described is being screwed onto the threaded step 13, the gearing 30 initially remains ineffective. The torque is transferred from the adjusting member 22 via its pinion 31, the planet wheels 37, 38 by friction directly onto the clamping nut 17 and the also co-rotating clamping member 21. If the flange 32 of the clamping member 21 comes to bear against the tool 15, and if, due to frictional engagement occurring in between, the clamping member 21 is braked, the effect of the gearing 30 begins. The turning of the adjusting member 22 in "clamping" direction is transferred via the pinion 31, and from there via the planet gears 37, 38, onto the clamping nut 17, which rotates relative to the braked clamping member 21, on the internal toothing 40 of which the planet wheels 37, 38 roll, the cylindrical sleeve 19 being axially screwed on further. With the annular flange 18, in this process the clamping nut 17 is pressed axially or firmly against the flange 32. The transmission ratio achieved by the gearing 30 effects a torque increase. The restoring torque occurring at the ring 39 with the internal toothing 40 is introduced into the tool 15 by the flange 32 integral with the ring, due to frictional engagement.

The frictional engagement between the tool 15 and the flange 32 effects to the same extent as with an otherwise known normal spindle nut automatic reclamping whenever the tool 15 happens to slip on the flange 16 during operation. The clamping fixture described is simple, cost-effective and quick, safe and easy to handle. It enables the tool 15 to be quickly and safely changed without requiring additional special tools for this purpose. A further advantage is that existing power hand tools, in particular grinding machines, can also be subsequently equipped with this clamping fixture without otherwise necessary further redesign. For this purpose, only the otherwise existing normal spindle nut needs to be replaced by the assembly, consisting of adjusting member 22, clamping nut 17, clamping member 21 with gearing 30 inbetween. Furthermore, this clamping fixture can be used with a quite normal spindle, without any other precautions in adaptation thereto having to be carried out. It is also advantageous that the adjusting member 22 can, as before, be designed, for example by outer tool application surfaces, in such a way that the adjusting member 22, as before, enables, if necessary, a special auxiliary tool to be applied, so that in particularly stubborn cases, e.g. in the slightly rusted state, a loosening in the usual way by using of such an auxiliary tool is possible.

The clamping fixture described is suitable for clamping all possible tools 15 and in connection with various types of power hand tool. It is especially suitable for grinding machines, e.g. angle grinders, and here for clamping disc-shaped tools 15 in place.

In another embodiment (not shown), the assembly described is used, for example, in conjunction with another motor-operated power hand tool, e.g. a circular hand saw.

Figure 3:
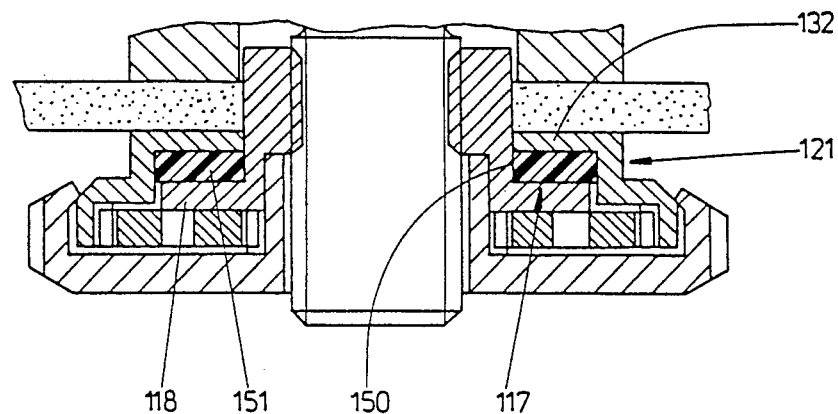
FIG. 3 shows a schematic, axial longitudinal partial cross-sectional view of a clamping fixture according to a second embodiment according to the invention.

In the second embodiment shown in FIG. 3, reference numerals increased by 100 are used for the parts which correspond to the respective parts of the first embodiment so that reference is thereby made to the description of the first embodiment to avoid repetitions.

The second embodiment according to FIG. 3 differs from the first embodiment in that a friction-reducing intermediate member 150 is arranged between the clamping nut 117 on one side and the clamping member 121 on the other side. This intermediate member consists of a disc 151 of friction-reducing material, e.g. of plastic. The disc 151 is seated axially between the annular flange 118, on one side, and the flange 132, on the other side. This interposed disc reduces the friction between the flange 132 and annular flange 118 of the clamping nut 117.

Figure 4:
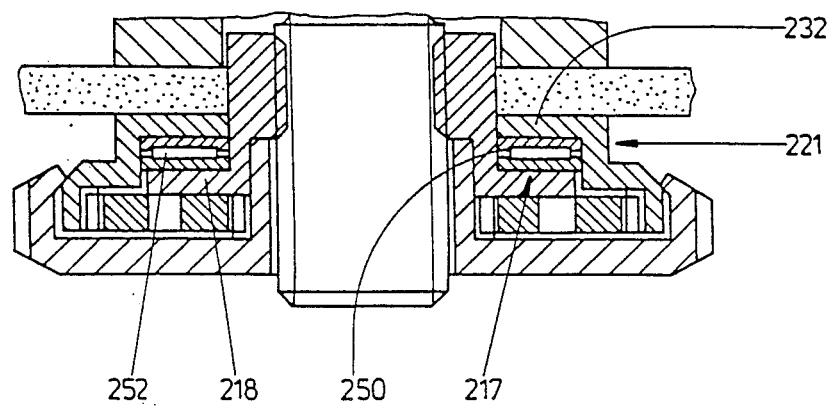
FIG. 4 shows a schematic axial longitudinal partial cross-sectional view of a clamping fixture according to a third embodiment according to the invention.

In the third embodiment in FIG. 4, there is likewise placed between the annular flange 218 of the clamping nut 217 and the flange 232 of the clamping member 221 a friction-reducing intermediate member 250, which is here formed however by an axial rolling bearing 252. In the embodiment shown, this is designed as a needle bearing. In another embodiment (not shown), the axial rolling bearing 252 may consist of a ball bearing, roller bearing or other type of rolling bearing. As a result, instead of the sliding friction, and, in comparison, still further reduced rolling friction occurs between the flange 232 and the annular flange 218.

In the fourth embodiment, shown in FIG. 5, for the reasons mentioned, reference numerals greater by 300 are used for the parts which correspond to the parts of the first embodiment.

In the fourth embodiment, a different embodiment of the gearing 330 is shown, likewise designed as a planetary wheel gear. The clamping member 321 has a hollow-cylindrical, central hub 360 and a flange 332, which is integral therewith, extends radially away and can be pressed axially onto the tool 315. The clamping nut 317 has a cylindrical sleeve 361, which is provided with internal thread and with which the nut can be screwed onto the threaded step 313 of the spindle 310. At the lower end, in FIG. 5, of the cylindrical sleeve 361, an annular step 362, integral therewith, extends radially away, the outer diameter of which corresponds essentially to that of the hub 360. With the end face 363 pointing towards the hub 360, the annular step 362 presses against the facing end face 364 of the hub 360. The clamping member 321 is centred and mounted with the hub 360 on the outer peripheral surface of the cylindrical sleeve 361 of the clamping nut 317, both parts being held together axially via a retaining ring 365, e.g. a snap ring, in such a way that an axial play remains.

The hub 360 of the clamping member 321 is provided on the outer peripheral surface with a spur gear 366, which is formed by radial teeth integral with it. In the same way, the outer peripheral surface of the annular step 362 of the clamping nut 317 is provided with a spur gear 367, which is here likewise formed by radial teeth integral with it. Both spur gears 366 and 367 form sun wheels of the gearing 330, which are jointly in gear-engagement simultaneously with at least one planet wheel 337. A plurality of individual planet wheels may also be provided. These may be loosely placed or held for themselves at a distance in circumferential direction on a cage (not shown), with which they can freely rotate.

The adjusting member 322, which is turned by hand, is designed here as a ring 368, which externally encloses the clamping member 321 in the region of the outer peripheral surface of the flange 332 and furthermore the clamping nut 317 and is rotatable relative thereto. The ring 368 is provided with an internal toothing 369. It forms the hollow wheel of the gearing 330, which is likewise in gear-engagement with the at least one planet wheel 337. The at least one planet wheel 337 or plurality of planet wheels are arranged in an annular space, which is bounded and closed off by the clamping member 321, by the annular step 362 of the clamping nut 317 and by the ring 368. For axial covering of this annular space on the underside, in FIG. 5, there extends radially outwards, starting from the annular step 362 up to the ring 368, a cover part 370. The cover part 370 is an integral part of the clamping nut 317.

The number of teeth of the spur gear 367 of the clamping nut 317 differs from the number of teeth of the spur gear 366 of the clamping member 321. It is of advantage if the number of teeth of the spur gear 367 is greater than that of the spur gear 366. The difference in the number of teeth may be, for example, two teeth. In an example, the spur gear 367 has 49 teeth, while the other spur gear 366 has only 47 teeth. The number of teeth of the internal toothing 369 of the ring 368 is greater than that of the spur gears 366 and 367. In an example, the internal toothing 369 has 65 teeth. The at least one planet wheel 337 has in this example 7 teeth.

This design of the gearing 330 has the following advantages. On turning of the ring 368, the planet wheels 337 roll on the internal toothing 369 and on the spur gear 367 of the clamping nut 317. For a complete revolution of the planet wheels 337, more than one rotation of the ring 368 is required. During a revolution of the planet wheels 337, the spur gear 367 of the clamping nut 317 is turned further by the difference in the number of teeth compared with the spur gear 366 of the clamping member 321. Overall, this produces a high transmission ratio from the ring 368 to the clamping nut 317. In the example mentioned with the number of teeth mentioned, this transmission ratio is 1:42. The gearing 330 has the advantage that it makes possible a large transmission ratio with a small space requirement and a simple design.

While the invention has been illustrated and described as embodied in a clamping fixture for axially clamping a disc, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A clamping fixture for axially clamping a tool, in particular a disc tool, on a flange of a driven spindle having an end portion with an outer thread, said clamping fixture comprising a clamping nut having an internal thread to be screwed on the end portion with an outer thread of the driven spindle; a clamping member arranged between the tool and said clamping nut for transmitting an axial clamping force to the tool upon tightening of said clamping nut; a manually operable adjusting member freely rotatable relative to the end portion of the driven spindle; and a gearing for gear-coupling said adjusting member to said clamping nut and gear-coupling said clamping nut to said clamping member, said gearing being arranged between said adjusting member and said clamping member and being formed as a planetary gear.

2. A clamping fixture according to claim 1, wherein said adjusting member, said gearing, said clamping nut, and said clamping member are connected to form a unitary assembly adapted to be screwed onto the end portion with an outer thread of the driven spindle as a nut.

3. A clamping fixture according to claim 1 wherein said gearing is formed as a single-stage step-up gear.

4. A clamping fixture according to claim 1, wherein said gearing is formed as a multi-stage step-up gear.

5. A clamping fixture according to claim 1, wherein said clamping member has substantially an inversely pot-shaped cross-section with a flange portion for engaging the tool and a cylindrical portion extending axially from said flange portion coaxially thereto, said clamping nut including a cylindrical sleeve portion having an internal threading defining said internal thread of said clamping nut, and an annular flange for applying the axial clamping force to said flange portion of said clamping member, said clamping nut being coaxially received within said clamping member.

6. A clamping fixture according to claim 5, wherein said cylindrical portion of said clamping member surrounds said annular flange of said clamping nut.

7. A clamping fixture according to claim 5, wherein said flange portion of said clamping member surrounds said sleeve portion of said clamping nut.

8. A clamping fixture according to claim 5, wherein said flange portion and said cylindrical portion of said clamping member surround, respectively, said sleeve portion and said annular flange of said clamping nut.

9. A clamping fixture according to claim 5, wherein said adjusting member is formed as a disc having a central opening and a solid radial extent having substantially a U-shaped cross-section which defines a central journal for receiving the end portion of the driven spindle, said central journal being received within said clamping nut.

10. A clamping fixture according to claim 9, wherein said clamping nut has in an axial area of at least one of said cylindrical sleeve portions and said annular flange thereof a cylindrical peripheral surface defining a bearing surface for said adjusting member.

11. A clamping fixture according to claim 10, wherein said central journal engages said bearing surface of said clamping nut.

12. A clamping fixture according to claim 11, wherein said adjusting member includes a pinion for applying a drive moment to said gearing upon rotation of said adjusting member.

13. A clamping fixture according to claim 12, wherein said pinion is supported on said central journal coaxially therewith.

14. A clamping fixture according to claim 13, wherein said disc has a disc portion and said central journal has an axially extending portion projecting beyond said disc portion, said pinion being supported on said axially extending portion of said central journal.

15. A clamping fixture according to claim 12, wherein said pinion is an integral part of said central journal.

16. A clamping fixture according to claim 12, wherein said pinion is formed as a sun wheel of said planetary gear.

17. A clamping fixture according to claim 16, wherein said clamping nut is formed as a planet carrier.

18. A clamping fixture according to claim 17, wherein said annular flange has an axial end surface remote from said clamping member and at least one bearing pin projecting from said axial end surface at a radial distance from a central axis of said clamping fixture for rotatably supporting a planet gear which engages said pinion.

19. A clamping fixture according to claim 18, wherein said clamping member includes an internally toothed ring arranged coaxially therewith and defining a hollow gear of said planetary gear, said planet gear having teeth engaging internal teeth of said hollow gear.

20. A clamping fixture according to claim 19, wherein said cylindrical portion of said clamping member has an end portion remote from said flange portion, said internally toothed ring being formed integrally with said end portion.

21. A clamping fixture according to claim 20, wherein said cylindrical portion of said clamping member includes an annular disc defining said end portion.

22. A clamping fixture according to claim 1, further comprising at least one friction-reducing intermediate member arranged between said clamping member and said clamping nut.

23. A clamping fixture according to claim 22, wherein said clamping member has a flange portion and said clamping nut has an annular flange, said intermediate member being located between said flange portion of said clamping member and said annular flange of said clamping nut.

24. A clamping fixture according to claim 23, wherein said intermediate member comprises a disc formed of a friction-reducing material.

25. A clamping fixture according to claim 24, wherein said friction-reducing material is a plastic material.

26. A clamping fixture according to claim 23, wherein said intermediate member comprises an axial rolling bearing selected from a group including a ball bearing, a roller bearing, and a needle bearing.

27. A clamping fixture according to claim 1, wherein said clamping member includes a flange portion for engaging the tool and a hub portion projecting axially therefrom, and said clamping nut includes a cylindrical sleeve portion having an internal threading defining said internal thread of said clamping nut, and an annular step portion extending radially from said cylindrical sleeve portion, said hub portion of said clamping member being supported on said cylindrical sleeve portion of said clamping nut, said annular step portion having an end face engaging an end surface of said hub portion for applying an axial force to said clamping member.

28. A clamping fixture according to claim 27, wherein said hub portion of said clamping member has a first outer diameter carrying a first spur gear, and said step portion of said clamping nut has a second outer diameter equal to said first outside diameter and carrying a second spur gear, said first and second spur gears forming sun wheels of said planetary gear.

29. A clamping fixture according to claim 28, wherein said second spur gear has a greater number of teeth than said first spur gear.

30. A clamping fixture according to claim 29, wherein said second spur gear has two more teeth than said first spur gear.

31. A clamping fixture according to claim 27, wherein said adjusting member is formed as a ring surrounding said clamping member and said clamping nut and rotatable relative to said clamping member and said clamping nut, and having an internal toothing defining a hollow wheel of said planetary gear.

32. A clamping fixture according to claim 31, wherein said internal toothing has a number of teeth that is greater than the number of teeth of said second spur gear.

33. A clamping fixture according to claim 32, wherein said clamping nut includes a cover part which extends radially outward with respect to said annular step-up to said ring and encloses from outside an annular space defined by said clamping member, said ring, and said step portion of said clamping nut.

34. A clamping fixture according to claim 33, further comprising at least one planet gear located in said annular space and engaging said internal toothing of said ring and first and second spur gears.

* * * * *